US008059506B2

(12) United States Patent
Finkelstein et al.

(10) Patent No.: US 8,059,506 B2
(45) Date of Patent: Nov. 15, 2011

(54) DIGITAL VIDEO RECORDER WIDE DYNAMIC RANGE OPTICAL POWER CALIBRATION

(75) Inventors: Jacob Moshe Finkelstein, Kraf-Saba (IL); Amit Miller, Haifa (IL); Erez Tsidon, Nir-Ezion (IL); Michael Levin, Holon (IL); Assaf Margalit, Zichron-Yaakov (IL)

(73) Assignee: Zoran Microelectronics Ltd., Haifa (IL)

( * ) Notice: Subject to any disclaimer, the term of this patent is extended or adjusted under 35 U.S.C. 154(b) by 296 days.

(21) Appl. No.: 12/476,128

(22) Filed: Jun. 1, 2009

(65) Prior Publication Data
US 2009/0238053 A1 Sep. 24, 2009

Related U.S. Application Data (63) Continuation-in-part of application No. 12/332,250, filed on Dec. 10, 2008, now abandoned.

(60) Provisional application No. 61/012,737, filed on Dec. 10, 2007.

(51) Int. Cl.
*G11B 7/00* (2006.01)
(52) U.S. Cl. .................................................. 369/47.53
(58) Field of Classification Search .................. 369/116, 369/47.5, 47.51, 47.52, 47.53
See application file for complete search history.

(56) References Cited

U.S. PATENT DOCUMENTS

| | | | | |
|---|---|---|---|---|
| 5,341,360 | A | * | 8/1994 | Johann et al. ............... 369/47.53 |
| 5,978,351 | A | | 11/1999 | Spruit et al. |
| 6,552,981 | B2 | | 4/2003 | Kim et al. |
| 6,557,126 | B1 | * | 4/2003 | Kelly ............................ 714/708 |
| 7,123,563 | B2 | | 10/2006 | Mimnagh et al. |
| 7,230,895 | B2 | | 6/2007 | Sasaki et al. |
| 7,263,043 | B2 | | 8/2007 | Watanabe et al. |
| 7,729,218 | B2 | * | 6/2010 | Tokiwa et al. ............. 369/47.53 |
| RE41,639 | E | * | 9/2010 | Lin ............................ 369/47.53 |
| 7,839,741 | B2 | * | 11/2010 | Kuijper ....................... 369/47.53 |
| 7,933,176 | B2 | * | 4/2011 | Van Endert et al. ....... 369/44.27 |
| 2007/0002705 | A1 | | 1/2007 | Hsin et al. |
| 2007/0153649 | A1 | | 7/2007 | Yu et al. |

* cited by examiner

*Primary Examiner* — Nabil Hindi
(74) *Attorney, Agent, or Firm* — Frommer Lawrence & Haug LLP; John W. Branch (57) ABSTRACT

A method and apparatus are presented for optimizing write operations for optical storage media. A determination is made, at least in part by iteration, of a next power range and a current score for a current power range. If it is determined that the current score is relatively equivalent to a maximum score, a plurality of final parameters is updated and provided, including an optimal power range and a final score. If it is determined that the current score is relatively greater than the final score, then the plurality of final parameters is updated. If it is determined that a maximum number of iterations has been performed, the plurality of final parameters is provided. Otherwise, the current power range is updated with the next power range. One or more of the returned plurality of final parameters are employed to optimize write operations for optical storage media. Determination of the score may also include determining validity of test data segments, selecting a score calculation criterion, and calculating the score based at least in part on the score calculation criterion and on a number and a sequence of valid test data segments. The score calculation criterion may be based on such criterion as beta criterion or modulation amplitude.

20 Claims, 6 Drawing Sheets

Fig. 6

DIGITAL VIDEO RECORDER WIDE DYNAMIC RANGE OPTICAL POWER CALIBRATION

CROSS-REFERENCE TO RELATED APPLICATIONS

This application is a Continuation-in-part of U.S. patent application Ser. No. 12/332,250 filed on Dec. 10, 2008. Ser. No. 12/332,250 is a Non-Provisional Application based on a previously filed U.S. Provisional Application 61/012,737 filed on Dec. 10, 2007, the benefits of which are hereby claimed under 35 U.S.C. §119(e) and incorporated herein by reference.

FIELD OF ART

The present invention is generally directed to power calibration for writing operations with optical media drives, and more specifically to determining an optimal power range for optimum power control (OPC) calculations used to calibrate optical media drives.

BACKGROUND

The recorded quality and cross-compatibility of optical media, such as optical discs, can be affected by the optical power used for writing data onto the optical media. Additionally, the optimum power level for writing optical media data can depend on many factors, such as media type, modulation criterion, writing speed, drive and type of hardware used. Also, the optimum power level can differ from system to system due to component and media variations. Thus, it can be difficult to determine the optimum power without the application of so-called Optimum Power Control (OPC) methods.

Standard OPC methods typically consist of first writing several short optical media data test segments. The data test segments are written with different power levels in a region of the optical media dedicated to this test procedure. Writing the data test segments may also involve the selection and application of a particular modulation criterion. The modulation criterion may be selected, for each implementation of an OPC method, from modulation criteria indicated as available for application in media specifications associated with each type of optical media.

Subsequently the data test segments are read back from the optical media and an analysis of the signal's modulation properties is performed. This analysis enables an optimum power level to be established. The collective execution of these stages of writing, reading, and analysis, which enables the determination of the optimum power level, is sometimes referred to herein as an optimal power control (OPC) calculation.

During an OPC calculation, it is impractical to test the entire range of power values possible at high resolution, due to limits on available processing time and required optical media area. Consequently, the testing is typically constrained to a limited range of values. In some optical media drive implementations, the test range is determined using a calibration procedure performed at the time of manufacture. In other cases, the test range is determined based upon an expected variation of the components and optical media used.

However, due at least in part to variations in the optical media drive and optical media performance, the appropriate power range for an OPC calculation may vary with component aging, and also may not be cross-media compatible. The invalidity of a signal modulation may also depend on the applied modulation criterion itself; for example, it may be too low to read, too high (saturated), or not in the correct area for linear approximation. Furthermore, for cases where offline power calibration is not applied to a system, an accurate power level may not be achieved during the writing stage of an OPC calculation, increasing the undesired bias of the results, since the power range intended for use may be different from that which is measured. As a result, modulation information read back may be only partially valid, and may degrade the OPC calculation, or even cause it to fail.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF EMBODIMENTS

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Also, as used herein, the term "online" generally refers to the execution of a function in sequence with, or in context with, a standard, final set of operations for a composite system, which commonly includes the execution of a plurality of other related functions. The term "offline" refers to the execution of a function in a separate context, distinct from a sequence of functions that comprise the standard, final set of operations for the composite system. Online may generally be considered to refer to a live or end-use stage of a system's application, while offline may be considered to refer to a setup or testing stage of a system's application.

Briefly stated, the invention is directed toward determining an optimal power range for an optimum power control (OPC) calculation. In at least one embodiment, an online power range calibration (OPRC) method comprises an iterative search for an optimal power range to be used by the OPC calculation.

By adaptively setting the power range, an example OPRC method achieves optimal input modulation conditions of an optical media and drive system combination for determining optical power. The OPRC method also takes into consideration the practical limitations of minimal optical media data area usage, with minimal calibration time. The invention is suitable for all optical media types, e.g. CD/DVD, –/+R/RW, BD (blu-ray), HD-DVD.

By finding the actual optimal power range for an OPC calculation, the OPRC method overcomes some of the difficult drawbacks of the OPC method used by itself.

Embodiments of the OPRC method, sometimes referred to herein as OPRC calibrations, also enable corner case systems to optimally perform OPC calculations, and be calibrated such that they employ optimal power levels for a particular media/system combination. Embodiments of the invention not only balance marginal systems, but can also compensate for originally unsuitable OPC parameters. Furthermore, offline power calibration may be eliminated, because the method finds the optimal power range without the need for such offline calibration.

In more detail, embodiments of the invention include an adaptive method to determine the appropriate power range over which to conduct the search for the optimum optical recording power level. More specifically, some embodiments execute an iterative power range search prior to a standard OPC calculations. In general, the accuracy and potency of the OPC calculation is enhanced. Yet, systems employing embodiments of the invention will generally be more reliable and will cost less to manufacture, in part because component tolerances may be loosened, and manufacturing calibration time and cost will be reduced.

Example Architecture

Figure 1:
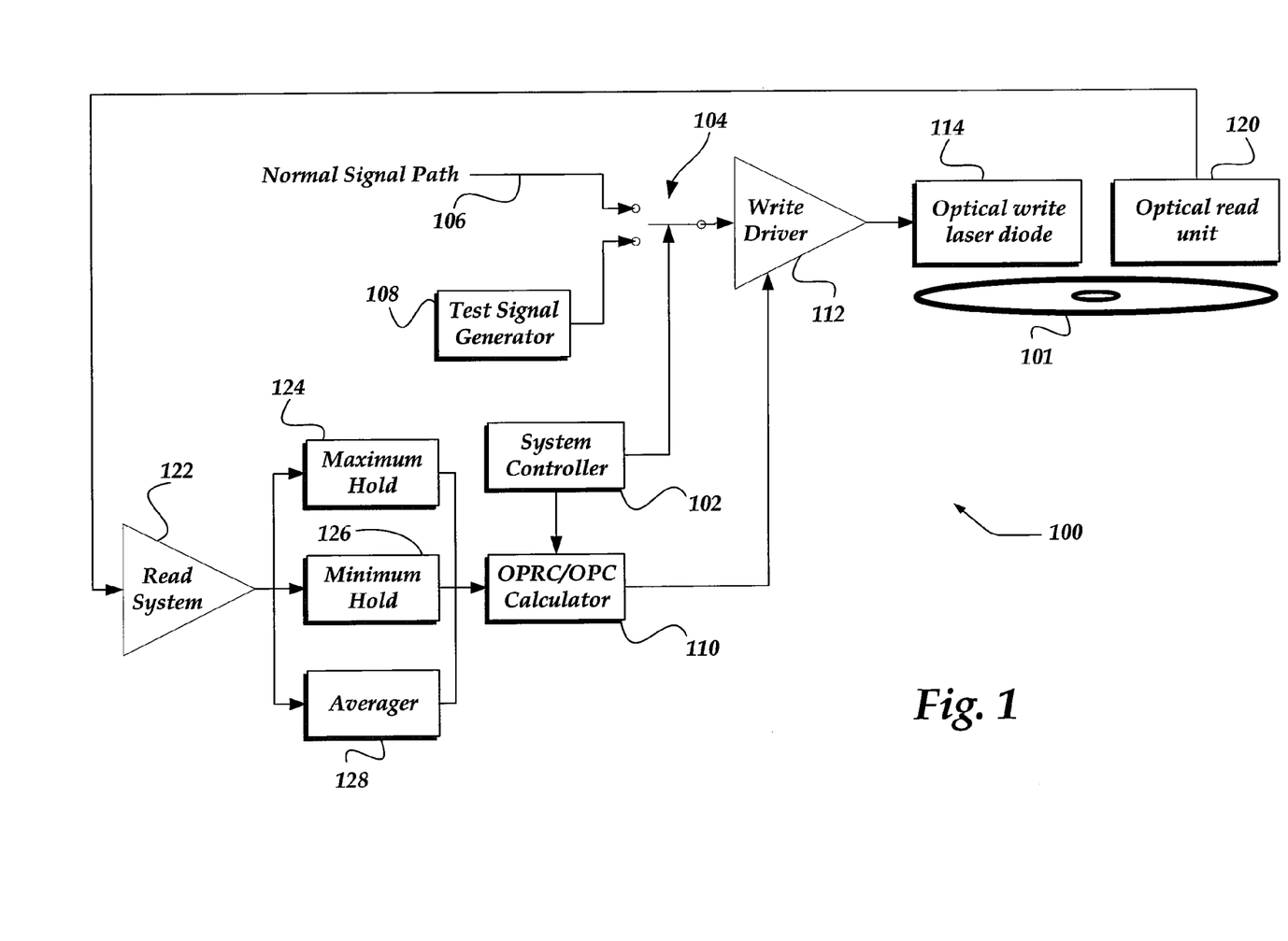
FIG. 1 is a schematic block diagram illustrating an example optical read/write system in which the invention may be practiced.

FIG. 1 is a schematic block diagram illustrating an example optical read/write system 100 in which the invention may be practiced. In one embodiment of the Online Power Range Calibration (OPRC) system, operations and calculations are performed and managed under firmware control, implemented by a processor executing instructions stored as data on a memory. However, it should be clear to those skilled in the art that any combination of hardware and software can achieve the same results, and are contemplated by this disclosure. These combinations include, for example, a computer or machine-readable storage medium having computer or machine-executable instructions stored thereon, which when executed by at least one processor, cause the at least one processor to enable an Online Power Range Calibration.

System 100 includes a system controller 102 coupled to an OPRC/OPC calculator 110. System controller 102 is also coupled to a switch 104 that switches between a normal signal path 106 and a test signal generator 108. Output of switch 104 is coupled to a write driver 112, which includes an amplifier in this embodiment. OPRC/OPC calculator 110 is also coupled to write driver 112 to provide gain control to write driver 112. Write driver 112 is coupled to an optical write laser diode 114, which writes onto an optical disc 101.

An optical read unit 120 reads from disc 101, and provides a signal to a read system 122, which includes another amplifier in this embodiment. Read system 122 provides an amplified signal to a maximum detector 124 that holds a maximum detected signal. Similarly, read system 122 provides the amplified signal to a minimum detector 126 that holds a minimum detected signal. Read system 122 further provides the amplified signal to an averager 128 that determines an average signal level. Maximum detector 124, minimum detector 126, and averager 128 each provide their corresponding output to OPRC/OPC calculator 110. With these inputs, OPRC/OPC calculator 110 performs OPRC/OPC calculations to determine a power range and an optimum power level. OPRC/OPC calculator 110 uses the calculated optimum power level to set the gain on write driver 112.

One implementation of the OPRC/OPC calculator 110 may comprise an OPC driver, executed in firmware. In one embodiment of a system 100 involving this form of OPC/OPRC calculator 110, the OPC driver may be in further communication with OPC segment writing and reading hardware mechanisms. Under the direction of the OPC driver, these hardware mechanisms may be jointly used in both OPC and OPRC calculations.

Figure 2:
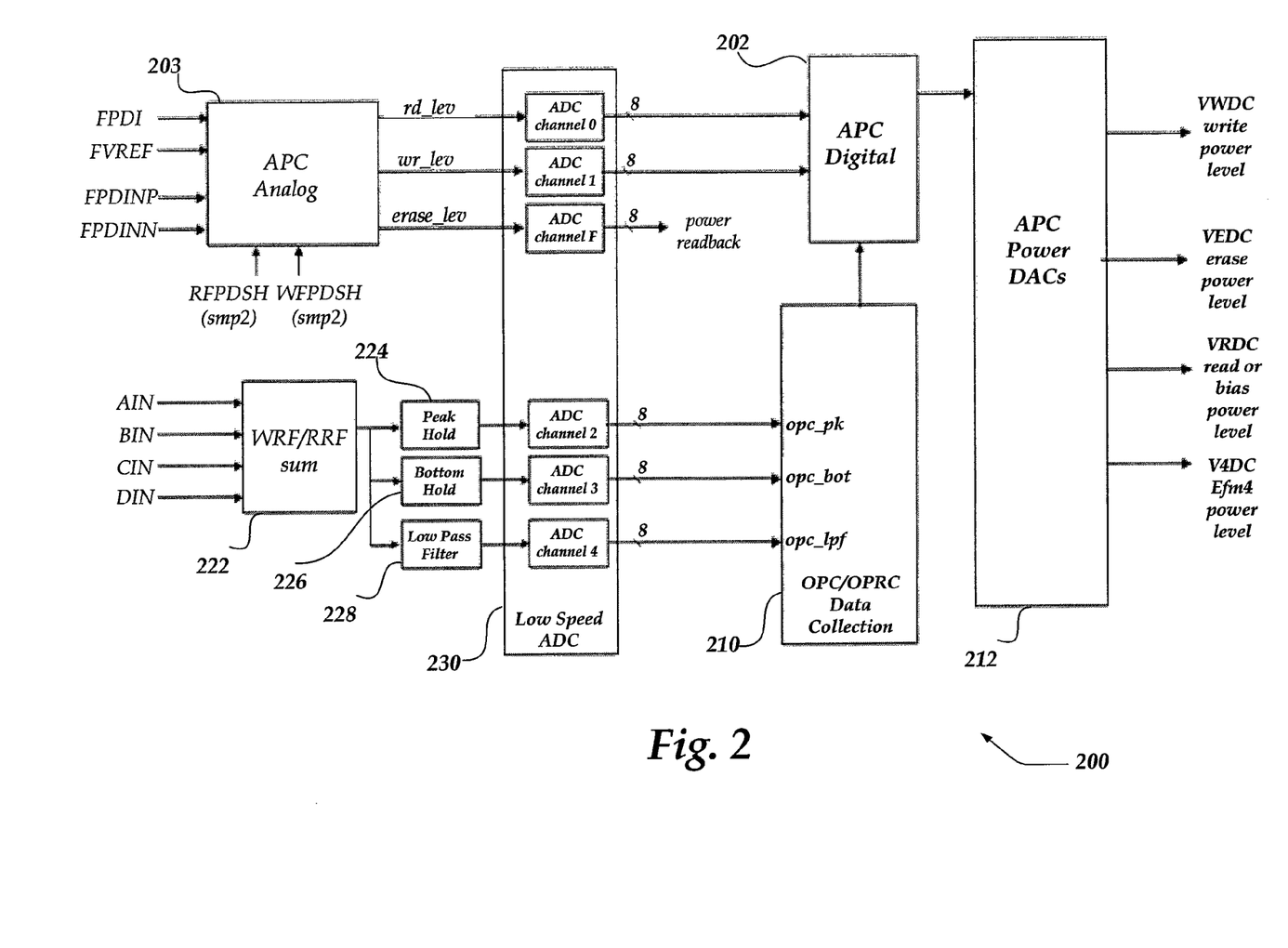
FIG. 2 is a schematic block diagram illustrating OPC segment writing and reading hardware mechanisms with which the invention may be practiced.

One embodiment of these hardware mechanisms 200 is further illustrated in FIG. 2. Comprising various modules shown in FIG. 2, an OPC segment writing hardware mechanism writes short segments with different power levels, each according to a specified power range. Writing is done into reserved area on the disc, as defined by the media specification associated with the disc. Following the writing, another hardware mechanism that also includes various modules of FIG. 2, an OPC segment reading hardware mechanism, is used to read back the modulation peak, bottom, and average (LPF) signal level of every segment written.

As further illustrated in FIG. 2, one embodiment of the OPC segment writing and OPC segment reading hardware mechanisms comprises a plurality of modules. An analog Automatic Power Control (APC) module 203 receives a plurality of reference signals and outputs analog indications of baseline read, write, and erase signal levels to one set of channels of a low speed, multi-channel analog-to-digital conversion (ADC) module 230. An analog signal adder module 222 receives a plurality of signals indicating the read and write signal levels applied and received during an OPC calculation. The adder module 222 supplies the sum of these indicator signal levels, also referred to herein as feedback signal levels, to the respective inputs of a peak hold filter module 224, a bottom hold filter module 226, and an averaging low pass filter module 228. After performing functions further discussed herein with regards to respective elements 124, 126, and 128 of FIG. 1, these filters 224, 226, 228 provide their respective output signals, representing a peak or maximum detected signal level, a bottom or minimum detected signal level, and an average signal level, to a second set of channels in the low speed, multi-channel ADC module 230. The digitized feedback signal levels from the filters 224, 226, and 228 are then collected in an OPC/OPRC Data Collection Module 210, which stores one set of the digitized filter signal levels for each data test segment. Using the digitized, baseline signal levels from analog APC module 203, as well as the digitized feedback signal levels collected in Collection module 210, a digital APC module 202 is enabled to further control the read and write operations of the system 100 in accordance these signal levels, as well as certain other operations and analysis, such as those further disclosed herein with regards to FIGS. 3 and 4. The control applied by digital APC module 202 is conducted in the form of an output signal from the digital APC module 202, which directs a multi-channel APC Power Digital-to-Analog conversion module 212 to provide, as output, an appropriate set of at least write, erase, and read power levels to be applied to the writing and reading hardware mechanisms of the composite optical read/write system.

In one embodiment, at least some of the modules of FIG. 2 are further included on a processor readable storage medium. Various modules of FIG. 2 may further be implemented or combined into a common module that includes at least the same functionality of modules 200. Such a storage medium may further include at least one module implementing the functionality discussed herein with regards to the OPC driver and/or the OPRC/OPC calculator.

Using the information obtained by the OPC segment reading hardware mechanism, the OPC driver is enabled to calculate the desired modulation information, which is typically beta for R media type, or modulation amplitude for RW media type. Both modulations are described in following sections. Using the calculated modulation information, the OPC driver is able to apply the appropriate test and optimal signal levels with the OPC segment writing hardware mechanism.

In one embodiment of system 100 of FIG. 1, OPRC/OPC calculations are initiated by system controller 102 in response to the action of the insertion of an optical disc 101 into the system 100. Rather than use a default power range determined either from a calibration procedure performed at the time of manufacture or from a standard power range based on the expected tolerance of the system components and the medium inserted, OPRC/OPC calculator 110 may execute an iterative power range search prior to an OPC calculation.

When a disc 101 is inserted into a system 100, such as shown in FIG. 1, there generally exist three possible conditions for the disc: it may be new and has never experienced a complete OPRC calibration with system 100; it may be used and already been successfully calibrated using an OPRC calibration; or it may be used and previous attempts to calibrate it have failed. In the first condition, an OPRC calibration may be initiated to determine a correct power range over which to perform OPC calculations, and the results of a successful OPRC cycle may be stored in a reserved location on the disc. In the second condition, the correct power range may be found on the disc in a reserved location written by a previous successful OPRC calibration, and this information may be used as the power range for OPC calculations. Finally, in the third condition, the location on the disc reserved for the OPRC power range may indicate a prior failure, and a default power range may be used for OPC calculations. It should be noted that OPRC is generally a system dependent operation; if OPRC is performed for a disc on a system and that disc is then inserted into a different system, it is handled as if OPRC was never performed (per the first condition).

As diagrammed in FIG. 1, the system controller 102 controls switch 104 that causes the source of write data to be switched away from the normal signal path 106 to a test signal generator 108 that generates a source of test data that may be particularly suited for the OPRC/OPC calculations. If OPRC calibration is required, one embodiment may proceed in the following manner:

(1) A default power range is selected. As discussed above, the default power range may be predefined at the time of manufacturing.

(2) A sequence of test data segments is written to a reserved area of the disc, each segment at ascending power levels, according to the current power range, in steps of a predefined size spanning the power range.

(3) The test segments are read back and the maximum, minimum and average signal levels are determined for each segment.

(4) Based on these signal levels, the validity of each segment is determined. A valid segment is one whose signal modulation properties are within acceptable segment ranges. The acceptable segment ranges may be predefined at the time of manufacturing, and may be dynamically adjusted based on performance feedback.

(5) From the number and sequence of valid segments in this cycle, a score is calculated for the current power range.

(6) If the score thus generated is sufficiently high to meet a score threshold, the current power range is accepted for use by the OPC cycle. If not, a new power range is determined based on the number and sequence of valid segments currently detected, and a new iteration of steps 2 through 6 is initiated.

(7) If the number of iterations reaches a limiting value, the OPRC cycle is terminated and the best found power range is used for the OPC cycle.

Figure 3:
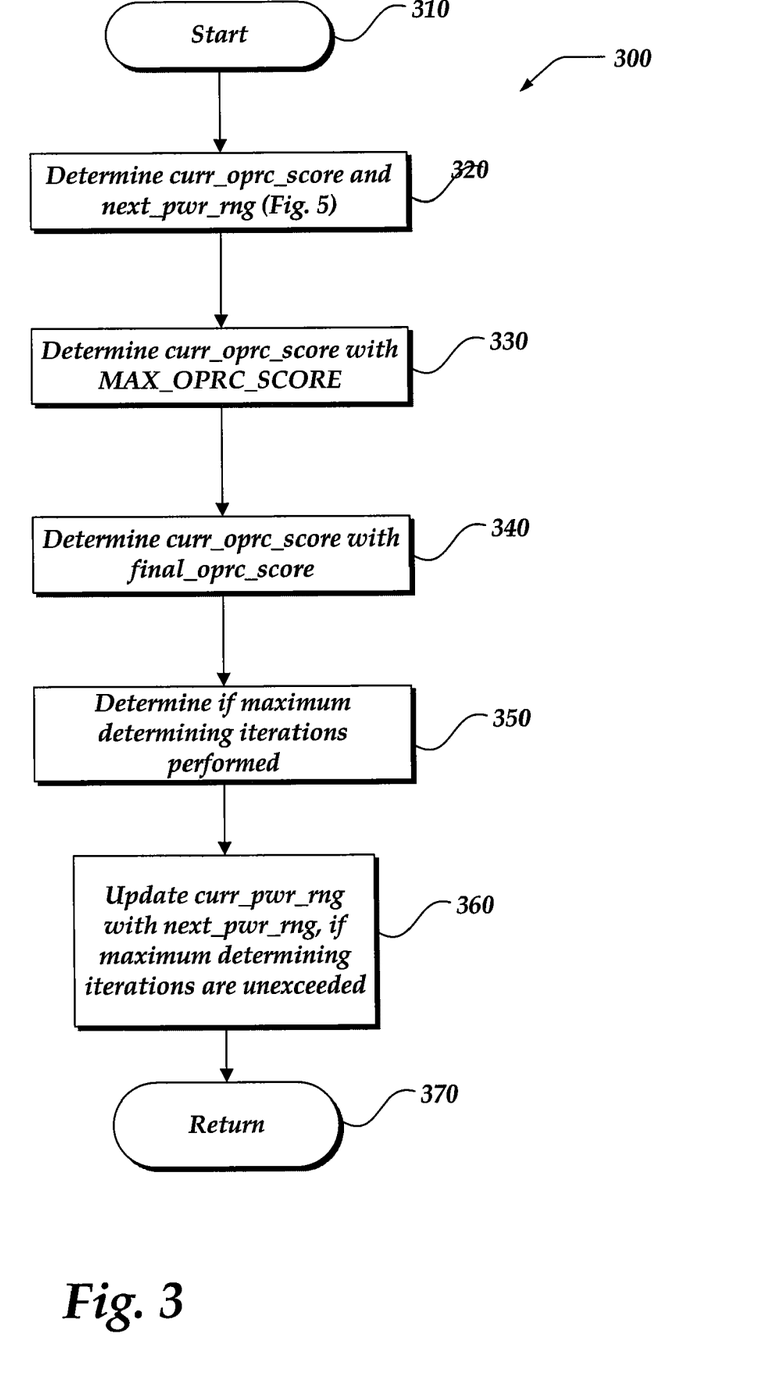
FIG. 3 is a flow diagram illustrating example logic according to an embodiment of the invention.

FIG. 3 is a flow chart depicting an embodiment of the invention. In this flow chart, curr_oprc_score and curr_pwr_rng indicate current OPRC score and current power range being tested; next_pwr_rng indicates a proposed next power range to test; and final_oprc_score indicates the final OPRC score. Example process 300 is initialized at operation 310, and such initialization may include setting initial values for curr_pwr_rng and final_oprc_score.

At operation 320, a current OPRC score is determined for the current power range being tested. A next power range is also determined, and may be based at least in part on the current power range being tested. Either or both of the current OPRC score and the next power range may be determined at least in part through an iterative process. The determinations of the current OPRC score and the next power range are further discussed herein with regard to FIG. 5.

At operation 330, it is determined whether the current OPRC score is relatively equivalent to a maximum OPRC score (MAX_OPRC_SCORE). The determination of the current OPRC score with the maximum OPRC score may be performed at least in part through an iterative process, which may be halted if it is determined that the current OPRC score is relatively equivalent to a maximum OPRC score. The maximum OPRC score may be a predefined value. For example, the maximum OPRC score may be a variable and/or predetermined constant at one end of a variable and/or predetermined scale, such as being set to ten on a scale of zero to ten.

At operation 340, it is determined whether the current OPRC score is relatively greater than or equal to a final OPRC score. This determination may be performed at least in part through an iterative process, and the final OPRC score may be a result of an OPRC calculation performed in a prior iteration. If in one iteration it is determined that the current OPRC score is relatively greater than or equal to the final OPRC score, then certain parameters may be updated before the next iteration commences. For example, the final OPRC score may be updated with the current OPRC score, and in this way the final OPRC score may hold the relatively highest OPRC score yet calculated in the process.

At operation 350, it is determined whether a maximum number of iterations has been performed. The maximum number of iterations may be a predefined number. If the maximum number of iterations has been performed, the process 300 may then return a set of one or more final parameters. In some embodiments, the final parameters may include the current power range, which the process may have determined to be an optimal power range to perform an OPRC calculation. The final parameters may also include the final OPRC score. In some embodiments, the process 300 may further include at least one OPC calculation to determine an optimal power level for writing to optical media. In that case, the set of final parameters may also include the optimal power level. At operation 360, if the maximum number of iterations are unexceeded the current power range being tested may be updated with a next power range such as that determined at operation 320. In this way, the next power range may be tested in a subsequent iteration. Process 300 returns at operation 370.

Figure 4:
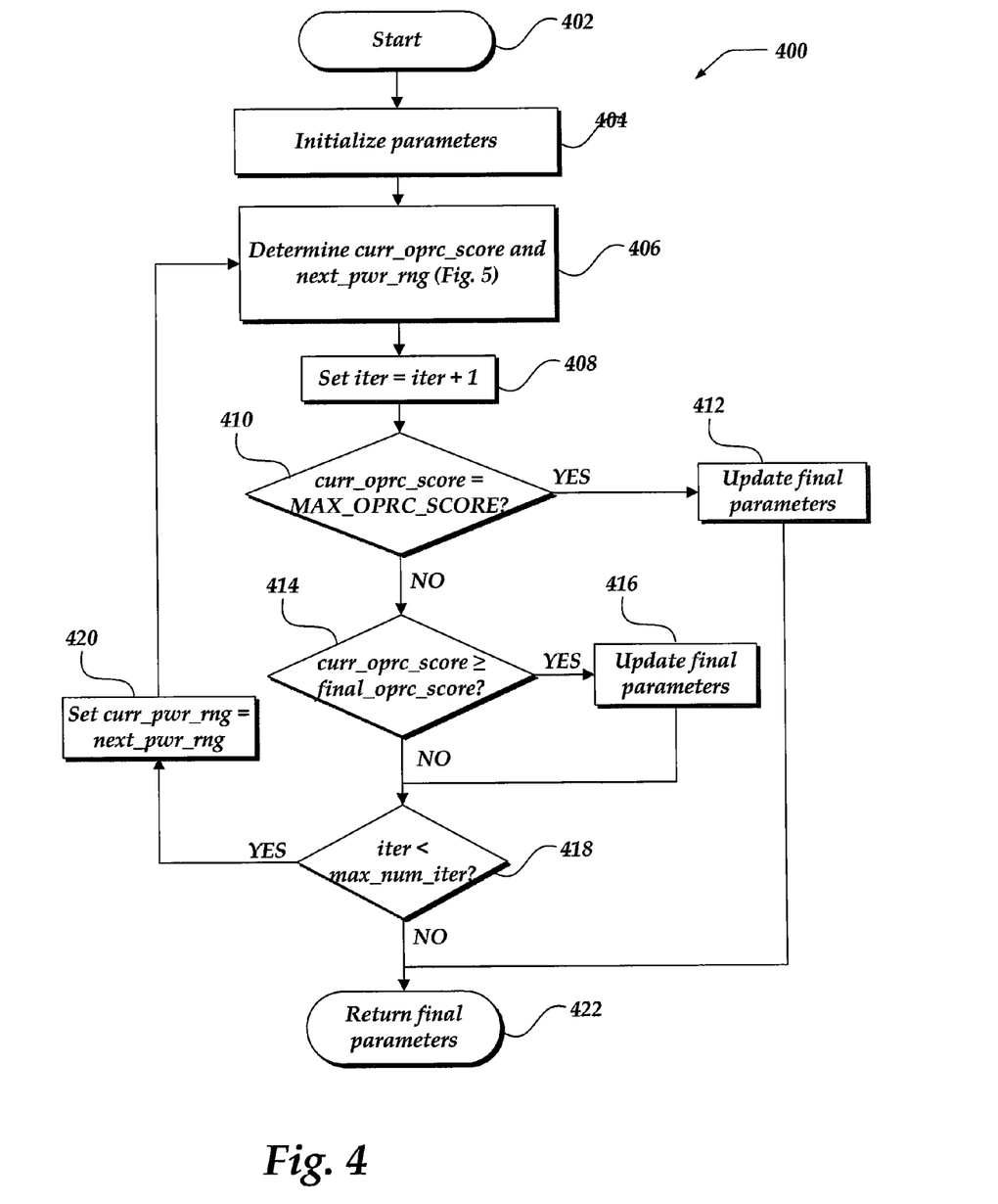
FIG. 4 is a flow diagram illustrating example logic according to an embodiment of the invention.

A more detailed flow chart of an example OPRC process flow is depicted in FIG. 4. In this flow chart, curr_oprc_score, and curr_pwr_mg indicate current OPRC score and current power range for the current iteration parameters, respectively; iter indicates the iteration number; next_pwr_rng indicates the proposed power range for the next iteration; and final_oprc_score indicates the final OPRC score. Final parameters, as referenced in FIG. 4, may include a final power range returned by the process, and may also include the final OPRC score. In some embodiments, the process may further perform at least one OPC calculation to determine an optimal power level for writing to optical media. In that case, the set of final parameters may also include the optimal power level. As referenced herein, the final optimal power level is generally considered equivalent to the optimal power level.

Example process 400 commences at operation 402. At operation 404, one or more parameters may be initialized. Initialization may include setting initial values for the current power range (curr_pwr_mg), the iteration counter (iter), and the final OPRC score (final_oprc_score). The current power range may be determined by being initialized to a predefined value, which may be set at the time of manufacture of the optical drive system. In the condition of a previously successful OPRC calibration (with the same system), the current power range may be determined by initializing the value to a power range found in a reserved location on the optical disc. In the condition of a previously failed OPRC calibration, the current power range may also be initialized to the predefined value after an indication of the failure is read from a reserved location on the disc. In some embodiments, the iteration counter and final OPRC score may be initialized to zero.

Though not illustrated in FIG. 4, parameters for executing an OPC calculation may also be set at operation 404. These parameters may include additional parameters related to an OPC calculation but not directly related to an OPRC calculation. Moreover, though not illustrated in FIG. 4, process 400 may also include an OPC calculation, wherein test data segments are written to the optical disc, read back from the optical disc, and analyzed to determine an optimal power level for write operations. An OPC calculation may execute a plurality of steps and algorithms in order to write, read and analyze test data segments. These stages of the OPC calculation may be performed, for example, using the OPC segment hardware mechanisms further discussed herein with regard to FIG. 2. Through the management and control of these hardware mechanisms, a processor executing the OPC calculation may use one or more parameters set at operation 404 such as the current power range value (curr_pwr_mg), to write the test data segments and initiate the OPC calculation.

At operation 406, a current OPRC score is determined for the current power range being tested. This determination may be made, in some embodiments, by an OPRC/OPC calculator such as that depicted in FIG. 1. A next power range is also determined, and may be based at least in part on the current power range being tested. Determining current OPRC score and the next power range may include the execution of certain OPRC-related functions such as segment validity calculation, score calculation selection, and proposed power range (PPR) calculation selection. The determinations of the current OPRC score and the next power range are further discussed herein with regard to FIG. 5. Although the determination of the current OPRC score and next power range are depicted as one operation in FIG. 4, in some embodiments these determinations may be performed in separate operations. The final determined OPRC score and power range may be stored in a reserved location on the optical media.

The OPRC-related functions at operation 406 are sometimes referred to herein as OPRC calculations. The execution of the OPRC calculations at operation 406, when included with one or more other operations depicted in FIG. 4, is sometimes referred to herein as an OPRC cycle. The operations considered to be included with each OPRC cycle are generally understood to be contiguous with other OPRC cycles, though not necessarily overlapping or included in these other OPRC cycles. The execution of one or more OPRC cycles, each comprising the performance of OPRC calculations, is sometimes referred to herein as OPRC calibration.

At operation 408, the iteration counter is incremented. Though FIG. 4 shows this iteration counter incremented after operation 406, the iteration counter may alternatively be incremented prior to operation 406. Generally, each iteration of determining an optimal power range is referred to herein as at least comprising operations 406 through 418.

At a decision operation 410, a determination is made whether the current OPRC score (curr_oprc_score) is generally equivalent to a maximum OPRC score (MAX_OPRC_SCORE). The maximum OPRC score may be a predefined value. It may also be a variable and/or predetermined constant at one end of a variable and/or predetermined scale. For example, the maximum OPRC score may be set to ten on a scale of zero to ten. If the current OPRC score is relatively equivalent to the maximum OPRC score, the final parameter values are updated at operation 412 and provided as output to be returned at operation 422. In such a condition, the current values for the current power range may be considered optimal, even though the proposed next power range has been determined in operation 406. As depicted in FIG. 4, the determination of relative equivalence between a maximum OPRC score and a current OPRC score may preclude the testing and analysis of the proposed next power range. Following return of the final parameters at operation 422, control may return to a system controller for normal operation of the optical disc drive system.

If at decision operation 410 it is determined that the current OPRC score is not relatively equivalent to a maximum OPRC score, the process proceeds to decision operation 414. Here it is determined whether the current OPRC score is relatively greater than or equal to the updated value of the final OPRC score (final_oprc_score). In operation 404, the final OPRC score may have been set to an initial value such as zero, but the final OPRC score may have been updated during previous iterations. If the current OPRC score is relatively greater than or equal to the current value of the final OPRC score, the final parameters may be updated at operation 416. In this case, the final parameters are updated to be equal to the current values. At this stage in process 400, the updated final parameters, including the final power range, may be considered optimal as compared to those parameters determined in previous iterations. However, these parameter values may not yet be returned as output.

Instead, a determination is made at decision operation 418 whether the iteration value (iter) is still less than a predefined maximum number of iterations (max_num_iter). If the maximum number of iterations has not yet been reached, control passes to operation 420 where the current power range (curr_pwr_rng) is updated with the proposed next power range. The process then returns to operation 406 to begin another iteration. The completion of operation 418 is sometimes referred to herein as the completion of one OPRC cycle, enabling a next iteration of processing to utilize an optimal power range determined in a previous iteration. Once the maximum number of iterations has been performed, the final parameters are provided as output and returned at operation 422. As discussed herein, final parameters may include an optimal power range and the final value of the OPRC score. In some embodiments, an OPC calculation may be performed by the OPRC/OPC calculator 110 following OPRC calibration. In such case, the optimal power level calculated by an OPC calculation may also be returned with the final parameters. Moreover, in some embodiments the optimal power range resulting from an OPRC calibration may be written to a reserved area on the current inserted disc, for use in subsequent OPRC- or OPC-related operations. Following operation 422, control may then return to the system controller for normal operation of the optical disc drive system.

Additional detail is now provided regarding example calculations and analysis performed in some embodiments of the invention, including calculations that may be performed at operation 320 of FIG. 3, and operation 406 of FIG. 4. These exemplary calculations are further discussed with regard to FIG. 5.

Segment Validity Calculations

Figure 5:
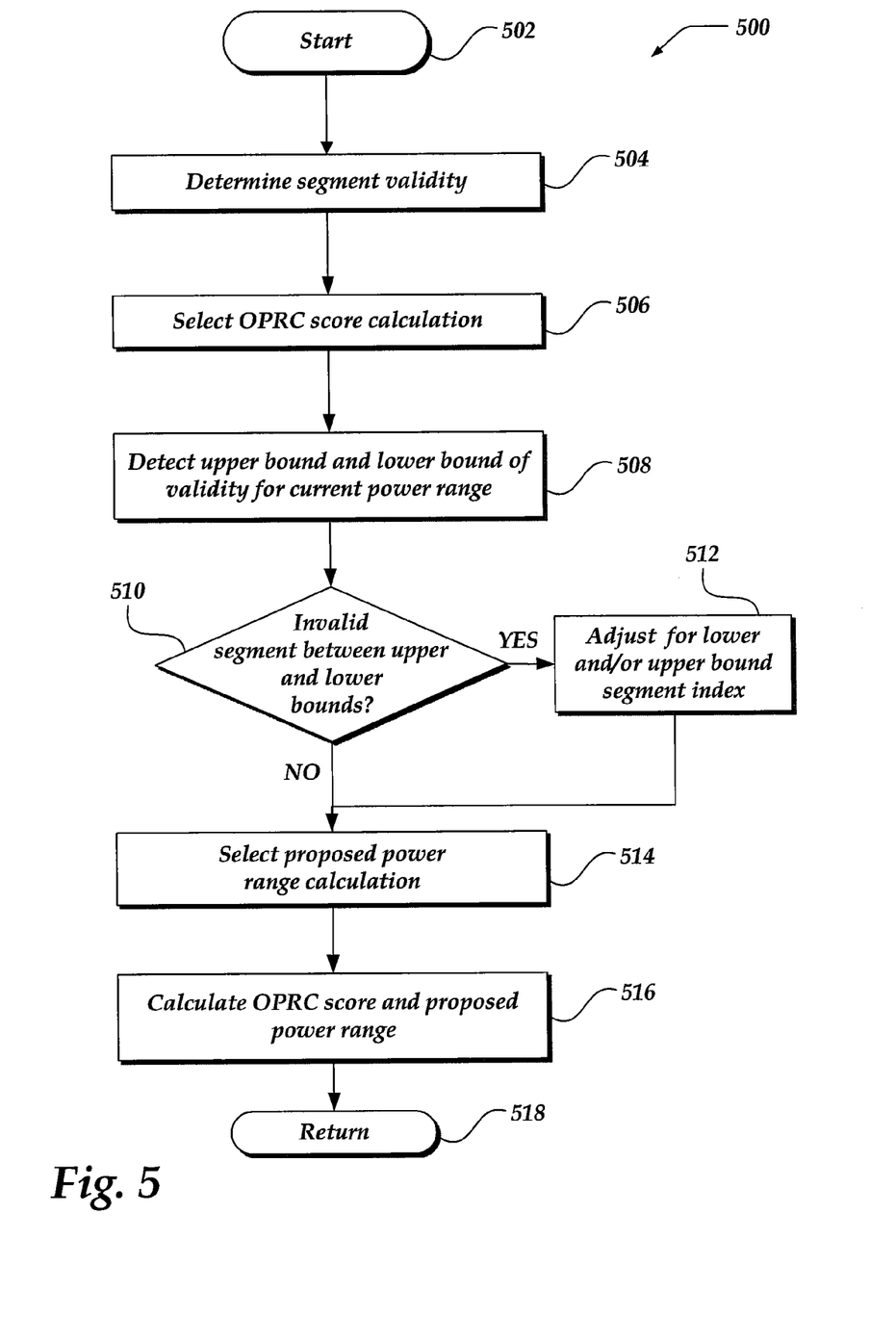
FIG. 5 is a flow diagram illustrating example logic according to an embodiment of the invention.

Segment validity may be determined in the course of OPRC calculations 500, as depicted in FIG. 5. In some embodiments, segment validity is determined 504 from signal modulation properties detected in the test segments which may be written and read as part of an OPC calculation or OPRC calibration. If the write drive power is too low, reading the test segments may result in a signal waveform skewed toward a low state value. Conversely, if the write drive power is too high, the read back signal waveform will be skewed toward a high state value. Embodiments of the invention may determine a power range such that the recorded signal is in a region where the signal modulation is approximately linear with power changes.

Embodiments of OPRC calculations 500 may be applied with any desired modulation criteria. To simplify the discussion, the following describes embodiments which utilize two commonly used modulation criteria—beta, and modulation amplitude. Beta is generally defined as the asymmetry percentage of the modulation, and is commonly used with R media type. Beta is given by:

$$\beta = 100 \frac{\max + \min - 2 \cdot avg}{\max - \min}$$

where max is the maximum value in the segment, min is the minimum value in the segment, and avg is the average value of the segment.

For RW media type, a common criterion for modulation quality is the modulation amplitude, given by:

$$m = \frac{\max - \min}{\max}$$

Regardless of the modulation criteria used, a test segment is declared to have one of the following states: valid (V); invalid (L) because it is too low (under-recorded); or invalid (H) because it is too high (over-recorded). This segment validity determination 504 may be made by comparison of the segment's modulation criterion (e.g., beta or modulation amplitude) to lower and upper bounds, $B_{lower}$ and $B_{upper}$. Segments whose criterion falls below the lower bound are declared under-recorded. Segments whose criterion rises above the upper bound are declared over-recorded. Segments whose criterion is within bounds are declared valid.

OPRC Score Calculations

The OPRC calculations 500 may also include a selection 506 of a manner for calculating an OPRC score. Selecting the appropriate OPRC score calculation may depend on the modulation criterion used to determine segment validity 504. Selection of the OPRC score calculation may be manual, and may involve receipt of an external indication of a selected calculation from controls external to a system 100. The selection may also be made automatically, based on a modulation criterion previously stored, or as part of the operations of the OPRC/OPC calculator 110. As described herein, in some implementations the possible scores may range from a minimum of zero to a maximum of ten.

One criterion on which a calculation may be selected is a beta modulation criterion. For the beta modulation criteria, a target modulation value (a parameter used during an OPC calculation as the desired modulation value) may include a requirement that there be at least a minimum number of segments from each end of a segment test sequence, so that the power range chosen is centered within the test segment sequence. Once an OPRC score calculation method is selected at operation 506, the OPRC score may be calculated along with a proposed power range, at operation 516. In some embodiments, the OPRC score (S) based on the beta criterion may be an average of three measures of quality, $S_1$, $S_2$, and $S_3$:

$$S = \frac{1}{3} \sum_{i=1}^{3} S_i$$

Where, $$S_1 = \begin{cases} \left\lfloor \frac{N \cdot \text{MAX\_OPRC\_SCORE}}{N_{valid\_min}} \right\rfloor, & \text{for } N < N_{valid\_min} \\ \text{MAX\_OPRC\_SCORE}, & \text{for } N \geq N_{valid\_min} \end{cases}$$

N=number of valid segments detected
$N_{valid\_min}$=minimum required number of valid segments
MAX_OPRC_SCORE=maximum OPRC score.

$$S_2 = \begin{cases} \left\lfloor \dfrac{K \cdot \text{MAX\_OPRC\_SCORE}}{N_{target\_edge}} \right\rfloor, & \text{for } K < N_{target\_edge} \\ \text{MAX\_OPRC\_SCORE}, & \text{for } K \geq N_{target\_edge} \end{cases}$$

K=number of segments from sequence edge to beta target
$N_{target\_edge}$=minimum number of segments from sequence edge to beta target.

$$S_3 = \begin{cases} \text{MAX\_OPRC\_SCORE}, & \text{for } PS_{size} = PS_{size\_min} \\ \dfrac{1}{2}\text{MAX\_OPRC\_SCORE}, & \text{for } 2PS_{size\_min} \geq PS_{size} > PS_{size\_min} \\ 0, & \text{otherwise} \end{cases}$$

$PS_{size}$=power step size used
$PS_{size\_min}$=minimum power step size allowed.

A second modulation criterion on which the OPRC score calculation selection 506 may be based is a modulation amplitude criterion. In some embodiments, an OPRC score based on the modulation amplitude criterion is calculated in the same way as $S_1$ above.

Current Valid Power Range

OPRC calculations 500 may also include detection 508 of the power range of valid segments in the sequence of test data segments. For any modulation criterion used, the current range of valid power segments may be evaluated, and may be based on a determination of the indices of the first and last valid segments within a contiguous range of valid segments. Each segment's power level and modulation value may be determined. The modulation value may be calculated based on the modulation criterion used, as discussed herein with regard to OPRC score calculation. In the examples below, the segments are numbered from 1 (the first segment written, at the lower power in the power range) to $N_{max}$ (the last segment written, at the highest power in the power range). The following indices may be detected as part of operation 508:

(1) Lower bound segment (LBS) index: LBS indicates the lowest valid segment index, such that all segments above and including it may have modulation values greater than or equal to the lower threshold, $B_{lower}$. In some embodiments, the method for determining the LBS index is to test the modulation criterion of each segment from the last segment written to the first, noting the segment index of the last segment whose modulation value is above $B_{lower}$. If the first recorded segment is encountered without discovering a modulation criterion value smaller than $B_{lower}$, the LBS index is set to 1.

(2) Upper bound segment (UBS) index: UBS indicates the highest valid segment index, such that all segments below and including it have modulation values smaller or equal to the upper threshold, $B_{upper}$. In some embodiments, the method for determining the UBS index is to test the modulation criterion of each segment from the first segment written to the last, noting the segment index of the last segment whose modulation value is below $B_{upper}$. If the last recorded segment is encountered without discovering a modulation criterion value larger than $B_{upper}$, the UBS index is set to $N_{max}$.

LBS and UBS are generally bounded by:

$\text{LBS} \in [1, U+1]$ $\text{UBS} \in [0, U]$

Where $U = N_{max}$.

Certain of these indices, such as U+1, may be beyond the range of valid indices in the sequence of data test segments. Reference to such indices, as applied herein, thus indicates that the upper or lower segment bounds are beyond the range of data test segments.

Because modulation measurements often have inaccuracy and noise, boundary values may tend to change from valid to invalid and vice versa. In such cases, may be desirable to avoid using corner valid segments, and consider the range within which values are both valid and stable. The following is an example of such a case.

In this example, the numbers indicate the segment index. The letters L, H, and V indicate values which are lower than threshold, higher than threshold, or valid, respectively. The valid range includes segments five through ten, even though segments 3 and 12 are considered valid; there are six valid segments, not eight.

Following this example, OPRC calculations 500 may include operations to remove such corner valid segments. Determination of a valid range may comprise an operation 510 to determine if at least one invalid data test segment has an index between the indices of the Upper and Lower Bound Segments detected at operation 508. If an invalid segment is detected, an operation 512 is performed, wherein the index of the Upper and/or Lower Bound Segment may be adjusted to bound a contiguous sequence of valid segments. More specifically, operation 512 may include adjusting the Upper Bound Segment to correspond to a valid segment with an index one lower than that of the a lowest index of one or more invalid segments. Similarly, operation 512 may include adjusting the Lower Bound Segment to correspond to a valid segment with an index one higher than that of the highest index of one or more invalid segments.

Proposed Power Range (PPR) Calculation for Modulation Amplitude Based Criterion

As depicted in FIG. 5, OPRC calculations 500 may also involve the calculation of an OPRC score and a proposed next power range at operation 516. However, in order for a next or proposed power range (PPR) to be determined at operation 516, it may be necessary to select a proposed power range calculation 514. As further discussed herein, selection of a proposed power range calculation 514 may depend on the modulation criterion (e.g., modulation amplitude or beta modulation) or on the current valid power range. In general, the next or proposed power range will include at least one end segment that is different from the corresponding end segment in the current power range. Further, the next or proposed power range may be more optimal than the power range represented in the current power range.

Calculation of the next or proposed power range takes place at operation 516. In the following example proposed power range calculations, PW indicates power width, where:

$\text{PW} = (N_{max} - 1) \cdot PS_{size\_min}$

In the following examples, the lowest segment has an index of one and the upper segment has an index of U (=$N_{max}$). PPR indicates the proposed power range. Five example cases of proposed power range calculations are described below, based on a modulation amplitude criterion.

Case 1: Range Too Low

In this case, UBS=U, and LBS≠1 or U+1 (i.e., all values are below the higher threshold). For example:

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
|   | L | L | L | L | L | L | L | L | L | L  | V  | V  | V  | V  |    |

↑ LBS         ↑ UBS

For this condition, the new proposed power range may be calculated as:

PPR=[power@LBS,power@LBS+PW]

Case 2: Range Too High

In this case LBS=1, and UBS≠U or 0 (i.e., all values are above lower threshold). For example:

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
|   | V | V | V | V | H | H | H | H | H | H  | H  | H  | H  | H  |    |

↑ LBS  ↑ UBS

For this condition, the new proposed power range may be calculated as:

PPR=[power@UBS−PW,power@UBS]

Case 3: Out of Range, Too Low

In this case UBS=U, and LBS=U+1 (i.e., all values are below lower threshold). For example:

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
|   | L | L | L | L | L | L | L | L | L | L  | L  | L  | L  | L  |    |

↑↑ UBS LBS

For this condition, the new proposed power range may be calculated as:

PPR=[power@seg#$U$+PS$_{size\_min}$,power@seg#$U$+PS$_{size\_min}$+2·PW]

Case 4: Out of Range, Too High

In this case UBS=0, and LBS=1 (i.e., all values are above higher threshold). For example:

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
|   | H | H | H | H | H | H | H | H | H | H  | H  | H  | H  | H  |    |

↑↑ UBS LBS

For this condition, the new proposed power range may be calculated as:

PPR=[power@seg#1−PS$_{size\_min}$−2·PW, power@seg#1−PS$_{size\_min}$]

Case 5: Otherwise (Default)

Otherwise, the valid range is within the current power range, but not enough valid segments exist. For example:

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| L | L | V | V | V | V | V | V | V | V | V  | V  | V  | H  | H  |    |

↑ LBS                   ↑ UBS

For this condition, the new proposed power range may be calculated as:

PPR=[power@LBS,power@UBS],

Proposed Power Range (PPR) Calculation for Beta Based Criterion

The PPR calculation at operation 516 may also be based on a beta criterion. In this case, the calculation may be similar to a calculation based on modulation amplitude criterion, but with slightly different handling due to the requirements of the beta target within the range.

In addition to the embodiments discussed herein, it is also possible to search for the correct power range explicitly over the entire range of possible values at the desired resolution, but that method may be more time-consuming and may use more disc space. Further, it is possible to perform the OPRC calibration each time the OPC calculation is performed, though this method may also be more time-consuming and use more disc space than the embodiments otherwise discussed herein.

After the OPRC score calculation and proposed power range calculation are selected in operations 506 and 514 respectively, these calculations may be applied in an OPRC cycle for an ongoing OPRC calibration of a disc 101 in a system 100. This results in a determination of a current OPRC score and a proposed power range for a particular OPRC cycle. The determination of values at operation 320 in FIG. 3 and operation 406 in FIG. 4 at least involves such calculations.

After such exemplary OPRC-related functions have been performed, control may then return 518 to process 400 which may use the values calculated for the current OPRC score and the proposed power range for ongoing OPRC calibration.

Figure 6:
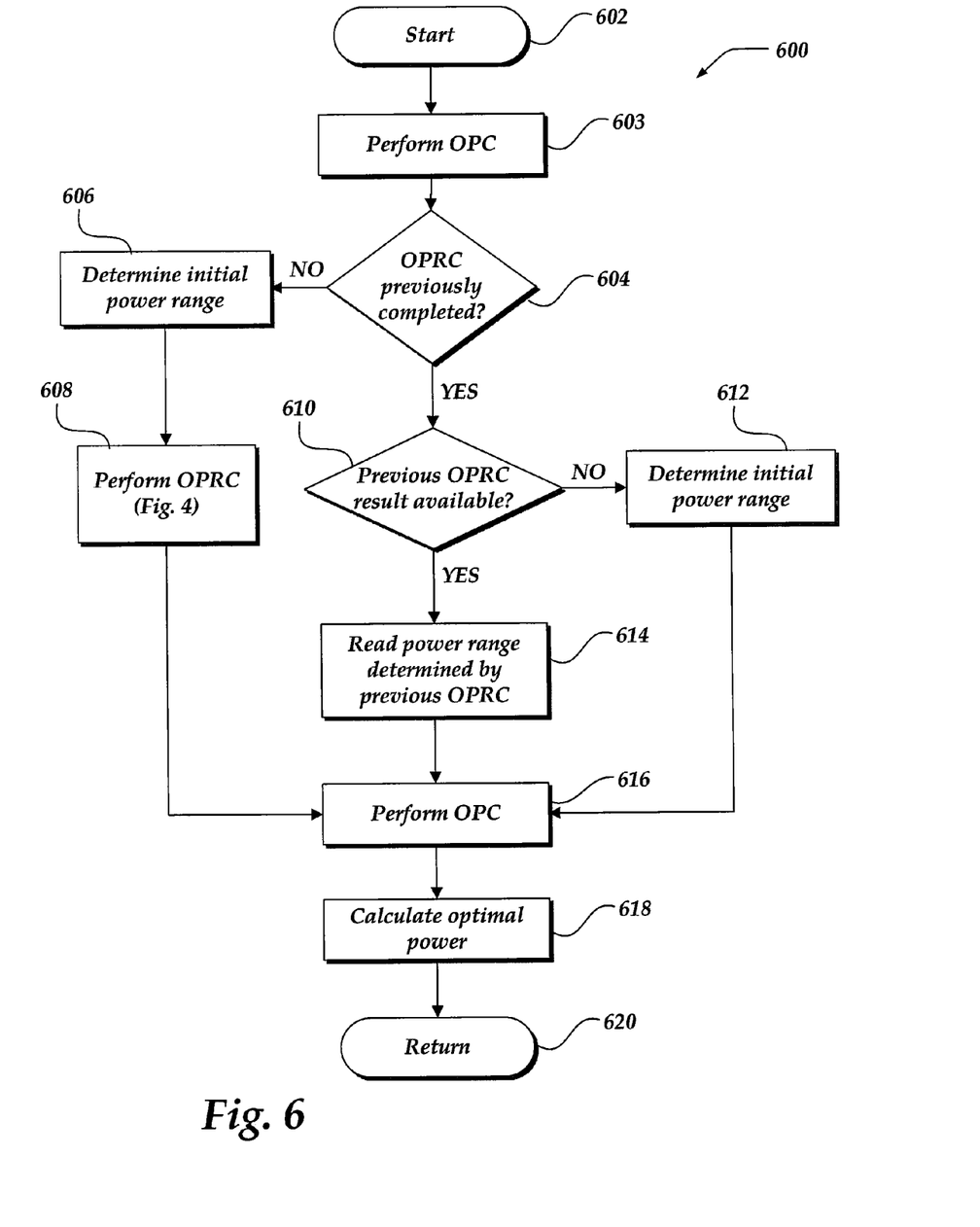
FIG. 6 is a flow diagram illustrating example logic according to an embodiment of the invention.

FIG. 6 is a flow chart depicting an embodiment of the invention. Process 600, as depicted in FIG. 6, may be performed by OPRC/OPC calculator 110. This process generally determines whether an OPRC calibration has previously been performed on the optical medium (e.g., disc) currently inserted into system 100. One of three conditions may apply to the currently inserted disc. First, the disc has never undergone an OPRC calibration (e.g., if the disc is new). Second, it may have undergone an OPRC calibration which completed successfully. Third, it may have undergone an OPRC calibration which failed. It should be noted that OPRC is generally a system dependent operation; if OPRC is performed for a disc on a system and that disc is then inserted into a different system, it is handled as if OPRC was never performed (per the first condition).

After process 600 initiates at operation 602, an OPC calculation may be performed at operation 603. The OPC calculation may include the setting of parameters related to an OPC calculation but not directly related to an OPRC calculation. In an OPC calculation, test data segments are written to the optical disc, read back from the optical disc, and analyzed to determine an optimal power level for write operations. An OPC calculation may execute a plurality of steps and algorithms in order to write, read and analyze test data segments. These stages of the OPC calculation may be performed, for example, using the OPC segment hardware mechanisms further discussed herein with regard to FIG. 2. Through the management and control of these hardware mechanisms, a processor executing the OPC calculation may use one or more parameters such as an initial or current power range value, to write the test data segments and initiate the OPC calculation. Results of an OPC calculation performed at operation 603 may be used as input to a subsequent OPRC calibration such as that performed at operation 608.

A decision operation 604 determines whether an OPRC calibration has previously been performed on the optical medium currently inserted into system 100. If it is determined that the disc has not experienced a complete OPRC calibration with system 100, then OPRC calibration is needed. This condition of an incomplete OPRC calibration may arise in various circumstances, such as when OPRC calibration has not previously been attempted, when OPRC calibration is ongoing, or when the currently inserted disc has not previously been inserted into and/or calibrated with the current system.

If it is determined at operation 604 that an OPRC calibration has not been previously completed, control passes to operation 606 at which an initial power range is determined. This initial range may be based, for example, on the result of a calibration procedure performed at time of manufacture of the system. The initial range may also be a standard power range based on an expected tolerance of system components and the medium inserted. Following determination of an initial power range, an OPRC calibration is performed 608, as discussed in more detail herein with regard to FIG. 4 and FIG. 5.

The OPRC calibration, if successful, may output an optimal power range which may then be used to perform an OPC calculation 616. The OPC calculation 616 may be performed by OPRC/OPC calculator 110. The current optimal power may, for example, be calculated in terms of milliwatts (mW) or any other suitable measure. Though shown as separate operations in FIG. 6, the operations 616 and 618 may be understood to constitute two portions of a process for OPC calculation. The calculation of an optimal power level at operation 618 represents the completion of an OPC calculation. Following calculation of optimal power at operation 618, control may then return 620 to system controller 102 for further operations of system 100.

If, at decision operation 604, it is determined that an OPRC calibration has been previously completed for the currently inserted disc, process 600 then proceeds to decision operation 610. Here it is determined whether the result of the previous OPRC calibration is available. In some embodiments, this previous result may be stored in a reserved location on the currently inserted disc. If a previous OPRC result is not available, an initial power range is determined 612. This initial range may be based, for example, on the result of a calibration procedure performed at time of manufacture of the system. The initial range may also be a standard power range based on an expected tolerance of system components and the medium inserted. Following determination of an initial power range 612, an OPC calculation may be performed 616, resulting in a calculation of an optimal power level 618, as discussed herein.

If, at decision operation 610, it is determined that a previous OPRC result is available, then that power range is read 614. As discussed herein, the power range resulting from the previous OPRC calibration may have been written to a reserved area on the currently inserted disc. In that case, the previously determined power range will be read from that reserved area at operation 614. The power range may then be used to perform an OPC calculation 616 resulting in a calculation of an optimal power level 618, as discussed herein.

The above specification, examples and data provide a description of the manufacture and use of the composition of the invention. Since many embodiments of the invention can be made without departing from the spirit and scope of the invention, the invention also resides in the claims hereinafter appended.

The invention claimed is:

1. A method for optimizing a write operation for optical storage media, comprising:
   determining at least in part by iteration a next power range and a current online power range calibration (OPRC) score for a current power range;
   determining at least in part by iteration if the current score is relatively equivalent to a maximum OPRC score, then updating and returning a plurality of final parameters including an optimal power range and a final OPRC score;
   if the determining at least in part by iteration of the current score is relatively greater than the final score, updating the plurality of final parameters; and
   if a maximum amount of determining iterations is performed, providing the plurality of final parameters, else updating the current power range with the next power range, wherein one or more of the provided plurality of final parameters are employed to optimize the write operation for optical storage media.

2. The method of claim 1, wherein determining the current score further comprises:
   determining a validity of each of a plurality of test data segments;
   selecting a score calculation criterion; and
   calculating the current score based at least in part on the score calculation criterion, and on a number and a sequence of valid test data segments.

3. The method of claim 2 wherein the score calculation criterion is a beta modulation criterion.

4. The method of claim 2 wherein the score calculation criterion is a modulation amplitude criterion.

5. The method of claim 1, wherein determining the current score further comprises:
   measuring a maximum signal level, a minimum signal level and an average signal level of test data read from each of a plurality of test data segments; and
   determining a validity of each test data segment based at least in part on the maximum, minimum, and average signal levels.

6. The method of claim 1 wherein determining the next power range further comprises:
identifying a contiguous sequence of one or more valid test data segments; and
selecting the next power range based at least in part on the contiguous sequence of valid test data segments.

7. The method of claim 6 wherein selecting the next power range is further based at least in part on a score calculation criterion and the current power range.

8. The method of claim 1 further comprising calculating an optimal power level for the write operation, and wherein the plurality of final parameters further includes the optimal power level.

9. The method of claim 1 further comprising:
reading result data written by a previous attempt to determine the optimal power range, wherein the result data at least indicates the previous attempt failed; and
returning an initial power range as the optimal power range.

10. The method of claim 1, further comprising:
reading result data written by a previous attempt to determine the optimal power range, wherein the result data at least indicates the previous attempt succeeded; and
returning at least a portion of the result data as the optimal power range.

11. The method of claim 1, further comprising initializing the plurality of final parameters, and initializing the current power range to an initial power range.

12. A processor readable storage medium having non-transitory processor executable program code instructions tangibly embodied therein that, when executed on a processor, cause the processor to enable actions for optimizing a write operation for optical storage media, the actions comprising:
determining at least in part by iteration a next power range and a current online power range calibration (OPRC) score for a current power range;
determining at least in part by iteration if the current score is relatively equivalent to a maximum OPRC score, then updating and returning a plurality of final parameters including an optimal power range and a final OPRC score;
if the determining at least in part by iteration of the current score is relatively greater than the final score, updating the plurality of final parameters; and
if a maximum amount of determining iterations is performed, providing the plurality of final parameters, else updating the current power range with the next power range, wherein one or more of the provided plurality of final parameters are employed to optimize the write operation for optical storage media.

13. The processor readable storage medium of claim 12, wherein determining the current score further comprises:
determining a validity of each of a plurality of test data segments;
selecting a score calculation criterion; and
calculating the current score based at least in part on the score calculation criterion, and on a number and a sequence of valid test data segments.

14. The processor readable storage medium of claim 13 wherein the score calculation criterion is a beta modulation criterion.

15. The processor readable storage medium of claim 13 wherein the score calculation criterion is a modulation amplitude criterion.

16. The processor readable storage medium of claim 12, wherein the actions further comprise calculating an optimal power level based on the current power range.

17. The processor readable storage medium of claim 12 wherein determining the next power range is based at least in part on a score calculation criterion and the current power range.

18. An apparatus configured to optimize a write operation for optical storage media, comprising:
a memory;
an optical diode, for writing information to the optical storage media;
an optical read unit, for reading information from the optical storage media; and
a processor for performing actions comprising:
determining at least in part by iteration a next power range and a current online power range calibration (OPRC) score for a current power range;
determining at least in part by iteration if the current score is relatively equivalent to a maximum OPRC score, then updating and providing a plurality of final parameters including an optimal power range and a final OPRC score;
if the determining at least in part by iteration of the current score is relatively greater than the final score, updating the plurality of final parameters; and
if a maximum amount of determining iterations is performed, providing the plurality of final parameters, else updating the current power range with the next power range, wherein one or more of the provided plurality of final parameters are employed to optimize the write operation for optical storage media.

19. The apparatus of claim 18, wherein the actions further comprise calculating an optimal power level using the optimal power range.

20. The apparatus of claim 18, further comprising:
a maximum hold unit, for receiving information from the optical read unit and for outputting a maximum value;
a minimum hold unit, for receiving information from the optical read unit and for outputting a minimum value; and
an averager, for receiving information from the optical read unit and for outputting an average value; and wherein determining the current score is further based at least in part on the maximum, minimum, and average values.

* * * * *

UNITED STATES PATENT AND TRADEMARK OFFICE
CERTIFICATE OF CORRECTION

PATENT NO. : 8,059,506 B2  
APPLICATION NO. : 12/476128  
DATED : November 15, 2011  
INVENTOR(S) : Jacob Moshe Finkelstein et al.

Page 1 of 1

It is certified that error appears in the above-identified patent and that said Letters Patent is hereby corrected as shown below:

On the title page, item (75), in Inventors, in column 1, line 1, delete "Kraf-Saba" and insert -- Kfar-Saba --, therefor.

On the title page, item (75), in Inventors, in column 1, line 3, delete "Nir-Ezion" and insert -- Nir-Etzion --, therefor.

In column 6, line 37, delete "mg" and insert -- rng --, therefor.

In column 7, line 28, delete "mg" and insert -- rng --, therefor.

In column 7, line 44, delete "mg)," and insert -- rng), --, therefor.

In column 8, line 6, delete "mg)," and insert -- rng), --, therefor.

In column 12, line 39, delete "the a" and insert -- the --, therefor.

Signed and Sealed this  
Tenth Day of April, 2012

David J. Kappos  
*Director of the United States Patent and Trademark Office*